(12) United States Patent
Smith

(10) Patent No.: US 10,559,793 B2
(45) Date of Patent: Feb. 11, 2020

(54) BATTERY ARRAY RETENTION METHOD AND ASSEMBLY

(71) Applicant: Ford Global Technologies, LLC, Dearborn, MI (US)

(72) Inventor: Micah Smith, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 15/982,236

(22) Filed: May 17, 2018

(65) Prior Publication Data
US 2019/0355948 A1 Nov. 21, 2019

(51) Int. Cl.
*H01M 2/00* (2006.01)
*H01M 2/10* (2006.01)
*H01M 10/625* (2014.01)
*B60K 1/04* (2019.01)

(52) U.S. Cl.
CPC .............. *H01M 2/1083* (2013.01); *B60K 1/04* (2013.01); *H01M 2/1077* (2013.01); *H01M 10/625* (2015.04); *H01M 2220/20* (2013.01)

(58) Field of Classification Search
CPC .............. H01M 2/1083; H01M 10/625; H01M 2/1077; H01M 2220/20; B60K 1/04
USPC ........................................................ 180/68.5
See application file for complete search history.

(56) References Cited

U.S. PATENT DOCUMENTS

| | | | |
|---|---|---|---|
| 4,754,827 A * | 7/1988 | Hirabayashi | B60R 16/04 180/68.5 |
| 7,331,559 B2 * | 2/2008 | Hirayu | B60R 16/04 180/68.5 |
| 8,403,090 B2 * | 3/2013 | Fujiwara | H01M 2/1077 180/68.5 |
| 2012/0103714 A1 * | 5/2012 | Choi | B60K 1/04 180/68.5 |
| 2013/0095360 A1 * | 4/2013 | Niedzwiecki | H01M 2/1077 429/99 |
| 2013/0284528 A1 * | 10/2013 | Kawasaki | B60K 7/0007 180/60 |

(Continued)

FOREIGN PATENT DOCUMENTS

| | | |
|---|---|---|
| CN | 202965916 | 6/2013 |
| CN | 106114180 | 11/2016 |

*Primary Examiner* — Paul N Dickson
*Assistant Examiner* — Hilary L Johns
(74) *Attorney, Agent, or Firm* — David Kelley; Carlson, Gaskey & Olds, P.C.

(57) ABSTRACT

An example retention method includes, among other things, resting opposing laterally outer regions of a battery array on a respective first and second rails that are disposed on an enclosure structure such that the battery array is spaced a distance from the enclosure structure. The method then includes securing, from at least one position between the laterally outer regions, the battery array relative to the enclosure structure. An example retention assembly includes, among other things, an enclosure, a first and a second rail, and a battery array having a first laterally outer region resting on the first rail and an opposing, second laterally outer region resting on the second rail. The battery array is secured relative to the enclosure at a position spaced from the first and second laterally outer regions to clamp the first and second laterally outer regions against the first and second rails.

18 Claims, 3 Drawing Sheets

(56) References Cited

U.S. PATENT DOCUMENTS

| | | | | |
|---|---|---|---|---|
| 2014/0272511 A1* | 9/2014 | Bolden | ................... | B60R 16/04 |
| | | | | 429/100 |
| 2015/0246650 A1* | 9/2015 | Nakajima | ................ | B60K 1/04 |
| | | | | 180/68.5 |
| 2015/0249240 A1* | 9/2015 | Hihara | .................... | B60K 1/04 |
| | | | | 180/68.5 |
| 2015/0273996 A1* | 10/2015 | Onodera | ................. | B60K 1/04 |
| | | | | 429/100 |
| 2016/0036018 A1 | 2/2016 | Gunna et al. | | |
| 2016/0099449 A1* | 4/2016 | Moschet | ............. | H01M 2/1077 |
| | | | | 429/100 |
| 2016/0133997 A1* | 5/2016 | Vejalla | ................ | H01M 10/615 |
| | | | | 429/120 |
| 2016/0190526 A1* | 6/2016 | Yamada | .............. | H01M 2/1077 |
| | | | | 180/68.5 |
| 2017/0324128 A1* | 11/2017 | Milton | .............. | H01M 10/6554 |

\* cited by examiner

US 10,559,793 B2

BATTERY ARRAY RETENTION METHOD AND ASSEMBLY

TECHNICAL FIELD

This disclosure relates generally to retention of a battery array within an enclosure of a traction battery pack.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electrified vehicles (HEVs), plug-in hybrid electrified vehicles (PHEVs), fuel cell vehicles (FCVs), and battery electrified vehicles (BEVs).

The traction battery pack can include several individual battery arrays within an interior of an enclosure. The battery arrays can each include a plurality of individual battery cells. Thermal exchange plates can be used to control thermal energy levels of the battery cells and other areas of the battery arrays.

SUMMARY

A retention method according to an exemplary aspect of the present disclosure includes, among other things, resting opposing laterally outer regions of a battery array on respective first and second rails that are disposed on an enclosure structure such that the battery array is spaced a distance from the enclosure structure. The method then includes securing, from at least one position between the laterally outer regions, the battery array relative to the enclosure structure.

Another non-limiting embodiment of the foregoing method includes drawing the enclosure structure and the battery array relatively closer to one another during the securing.

Another non-limiting embodiment of any of the foregoing methods includes, during the securing, mechanically fastening an endplate of the battery array to an anchor plate that is secured directly to the enclosure structure.

In another non-limiting embodiment of any of the foregoing methods, the endplate is spaced a distance from the anchor plate after the resting and prior to the securing. The endplate contacts the anchor plate after the securing.

In another non-limiting embodiment of any of the foregoing methods, at least the anchor plate flexes toward the endplate during the securing.

In another non-limiting embodiment of any of the foregoing methods, the securing is after the resting.

In another non-limiting embodiment of any of the foregoing methods, a clamp load path resulting from the securing extends through the laterally outer regions and the first and second rails.

In another non-limiting embodiment of any of the foregoing methods, the securing clamps the laterally outer regions against the first and second rails.

In another non-limiting embodiment of any of the foregoing methods, the battery array is a traction battery array.

Another non-limiting embodiment of any of the foregoing methods includes directly contacting a thermal exchange plate of the battery array with the rails during the resting.

A retention assembly according to another exemplary aspect of the present disclosure includes, among other things, an enclosure, a first and a second rail, and a battery array having a first laterally outer region resting on the first rail and an opposing, second laterally outer region resting on the second rail. The battery array is secured relative to the enclosure at a position spaced from the first and second laterally outer regions to clamp the first and second laterally outer regions against the first and second rails.

In another example of the foregoing assembly, the first and the second rails are secured directly to a floor of the enclosure.

In another example of any of the foregoing assemblies, the battery array is vertically elevated relative to the floor to provide a space between the battery array and the floor.

Another example of any of the foregoing assemblies includes an anchor plate and a mechanical fastener. The anchor plate is secured directly to the enclosure between the first and the second rails. The mechanical fastener engages the anchor plate to secure the battery array relative to the enclosure.

In another example of any of the foregoing assemblies, the mechanical fastener extends through an aperture in an endplate of the battery array to engage the anchor plate.

In another example of any of the foregoing assemblies, the mechanical fastener threadably engages the anchor plate.

In another example of any of the foregoing assemblies, the anchor plate and the enclosure include portions that are flexed toward the battery array when the mechanical fastener engages the anchor plate.

In another example of any of the foregoing assemblies, the anchor plate is disposed vertically beneath the battery array.

In another example of any of the foregoing assemblies, the mechanical fastener applies a clamp load when the mechanical fastener engages the anchor plate. A path of the clamp load extends through areas of the laterally outer regions that interface with the first and second rails.

Another example of any of the foregoing assemblies, includes a thermal exchange plate. The first and second laterally outer regions are laterally outer regions of the thermal exchange plate such that the thermal exchange plate spans from the first rail to the second rail and directly contacts both the first rail and the second rail.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to retention of an array within a battery pack of an electrified vehicle. In particular, the disclosure is directed toward a retention strategy that facilitates consistent thermal contact between areas of the battery array disposed within a limited volume/space.

Figure 1:
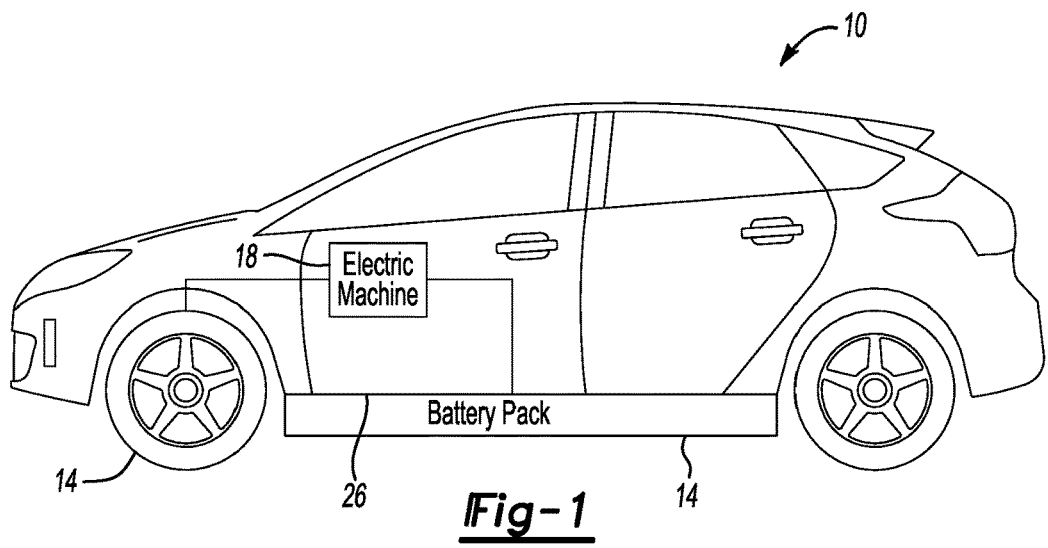
FIG. 1 illustrates a side view of an electrified vehicle according to an exemplary aspect of the present disclosure.

Referring to FIG. 1, an electrified vehicle 10, in an exemplary non-limiting embodiment, includes a battery pack 14 that powers an electric machine 18. The electrified vehicle 10 includes wheels 22 driven by the electric machine 18. The electric machine 18 can receive electric power from the battery pack 14 and convert the electric power to torque to drive the wheels 22. The battery pack 14 can be a relatively high-voltage (e.g., 350 VDC) battery.

The battery pack 14 is secured to an underbody 26 of the electrified vehicle 10, but could be located elsewhere in other examples. The battery pack 14 can be secured to the underbody 26 with, for example, mechanical fasteners about an outer perimeter of the battery pack 14.

The electrified vehicle 10 is an all-electric vehicle. In other examples, the electrified vehicle 10 is a hybrid electric vehicle, which selectively drives wheels using torque provided by an internal combustion engine instead of, or in addition to, the electric machine 18. Generally, the electrified vehicle 10 could be any type of vehicle having a traction battery pack.

Figure 2:
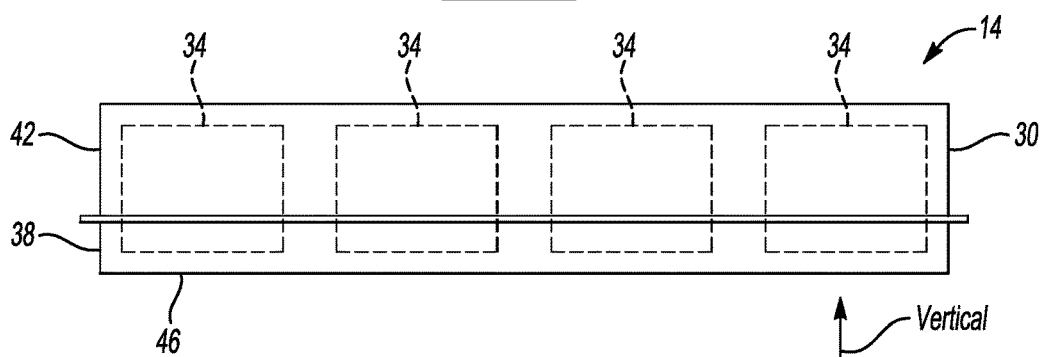
FIG. 2 illustrates a side view of a battery pack from the electrified vehicle of FIG. 1.

Referring now to FIG. 2, an example battery pack 14 includes an enclosure 30 housing a plurality of battery arrays 34. The enclosure 30, in this exemplary non-limiting embodiment, includes a tray 38 and a lid 42. The lid 42 is secured to the tray 38 to enclose the battery arrays 34.

In this exemplary non-limiting embodiment, the battery arrays 34 are supported in a position that is vertically above the floor 46. The battery pack 14 includes four battery arrays 34 disposed horizontally adjacent to one another, but other numbers and arrangements of battery arrays 34 could be used in other examples. Vertical and horizontal, for purposes of this disclosure, are with reference to ground and the ordinary orientation of the electrified vehicle 10 during operation.

Figure 3:
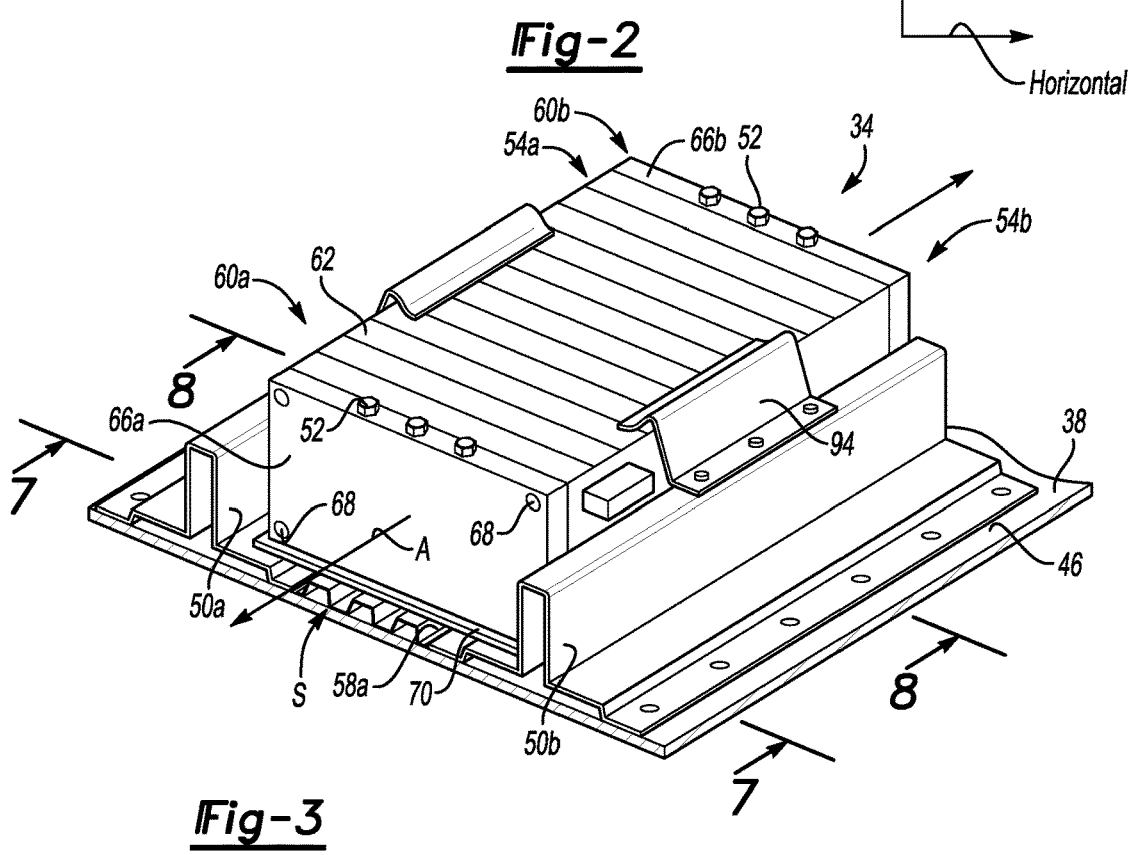
FIG. 3 illustrates a perspective view of a battery array from the battery pack of FIG. 2 secured to a portion of an enclosure of the battery pack.
Figure 4:
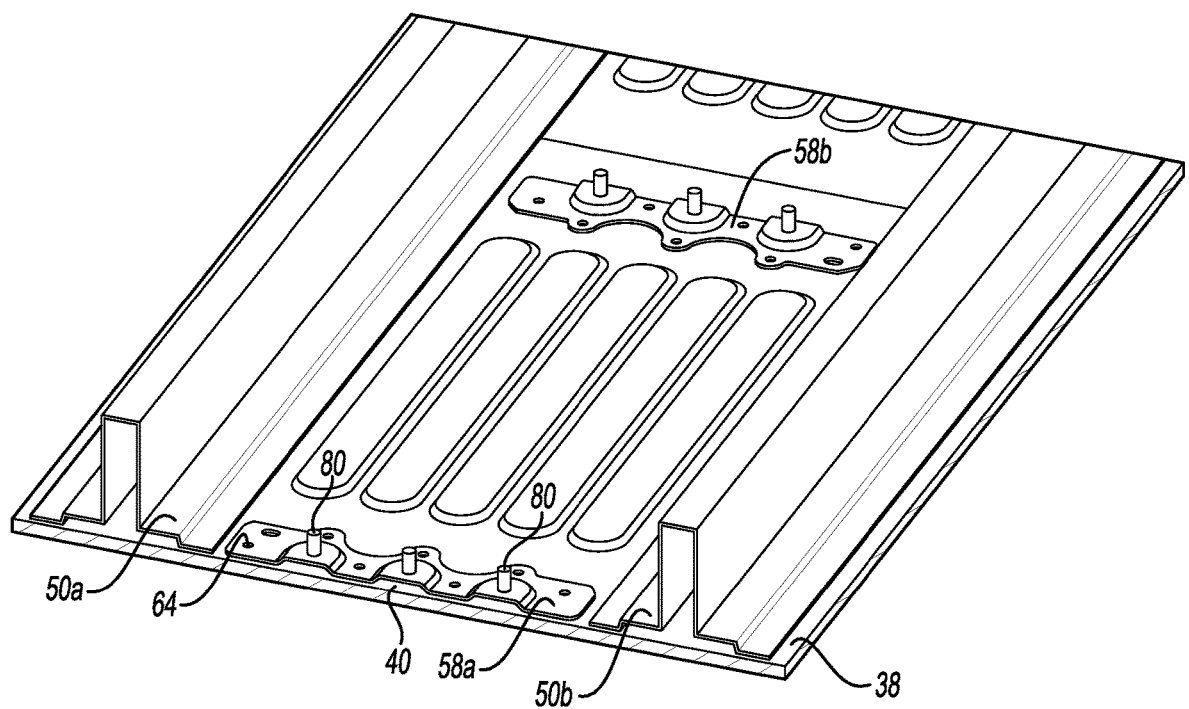
FIG. 4 illustrates the portion of the enclosure from FIG. 3 with the battery array removed.
Figure 5:
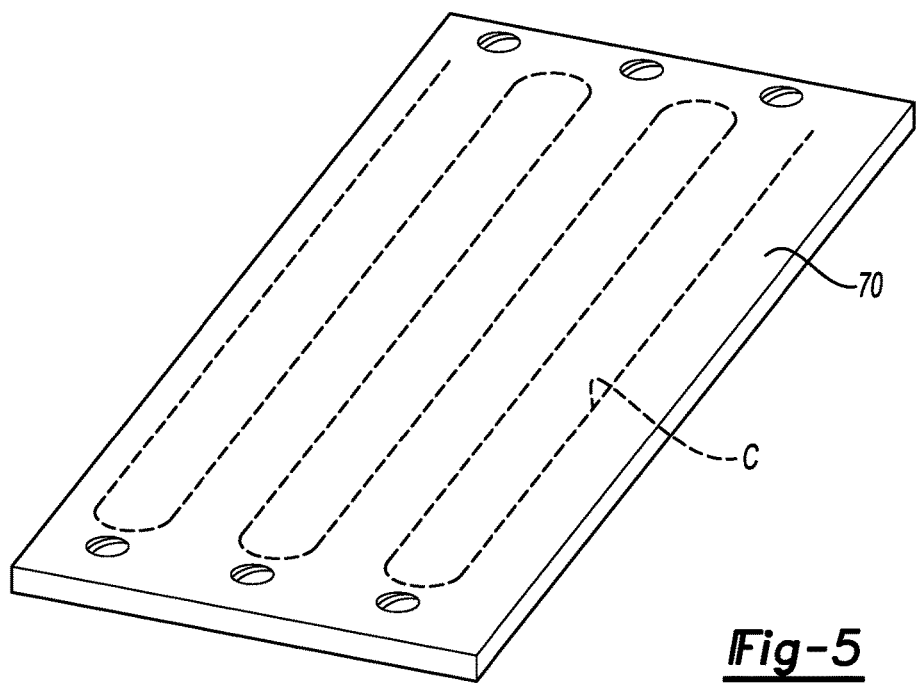
FIG. 5 illustrates a perspective view of a thermal exchange plate from the battery array of FIG. 3.
Figure 6:
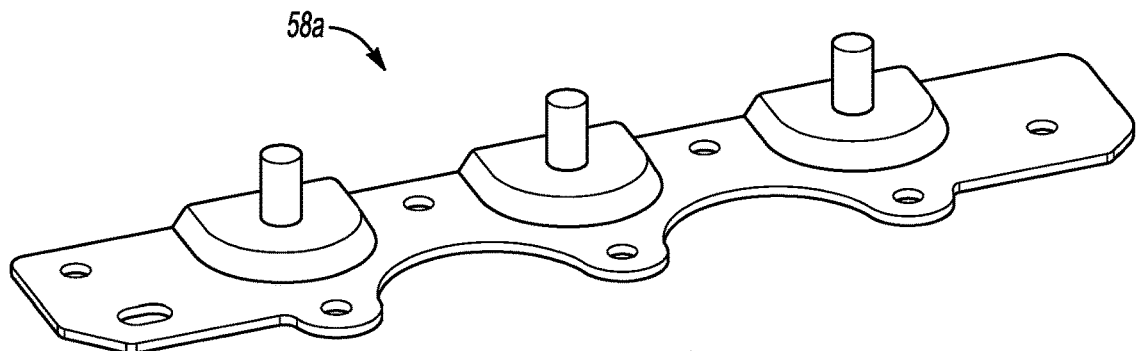
FIG. 6 illustrates a perspective view of an anchor plate secured to the portion of the enclosure in FIG. 4.

With reference now to FIG. 3, a retention assembly is utilized to retain each of the battery arrays 34 within the enclosure 30. The retention assembly includes, in this exemplary non-limiting embodiment, the enclosure 30, a first rail 50a, a second rail 50b, a plurality of mechanical fasteners 52, and an anchor plate 58a. The rails 50a, 50b are horizontally spaced from each other. The rails 50a, 50b each extend longitudinally in a direction aligned with a longitudinal axis of the battery array 34. The rails 50a, 50b are secured directly to the floor 46 in this example. Mechanical fasteners, such as bolts or rivets, could be used to secure the rails 50a, 50b to the floor 46.

When the battery array 34 is retained, a first laterally outer region 54a of the battery array 34 rests on the first rail 50a, and an opposite, second laterally outer region 54b rests on the second rail 50b. Generally, the first laterally outer region 54a extends from a laterally outermost face of the battery array 34 inwardly toward the axis A. Similarly, the second laterally outer region 54b extends from an opposite laterally outermost face of the battery array 34 inwardly toward the axis A.

Resting the laterally outer regions 54a, 54b on the respective rails 50a, 50b positions the battery array 34 vertically above an enclosure structure, here the floor 46 of the tray 38. The battery array 34 resting on the rails 50a, 50b is spaced vertically a distance from the floor 46 to provide a space S between the battery array 34 and the floor 46.

With reference now to FIGS. 4-8 and continuing reference to FIG. 3, the anchor plate 58a is disposed at a first axial end 60a of the battery array 34. The exemplary retention assembly further includes a second anchor plate 58b at an opposite, second axial end of the battery array 34. The anchor plates 58a and 58b are disposed, at least partially, within the space S between the floor 46 and the battery array 34.

The anchor plates 58a, 58b are directly attached to the floor 46 via rivets 64. Other approaches could be utilized to attach the anchor plate 58A to the floor 46 in other examples, such as other mechanical fasteners or welds. The fastening strategy used to secure the anchor plate 58a to the floor 46 is configured to avoid failure in response to lateral forces, such as those due to an impact event.

The anchor plates 58a, 58b can be stamped parts, for example. The rails 50a, 50b could be plastic, extruded aluminum, stamped or rolled steel, etc.

The battery array 34 includes a plurality of individual battery cell assemblies 62 positioned axially between endplates 66a, 66b. Retention rods 68 can extend from the endplate 66a to the endplate 66b and be tightened to compress the battery cell assemblies 62 axially between the endplates 66a, 66b.

The battery cell assemblies 62 and the endplates 66a, 66b are disposed upon a thermal exchange plate 70 of the battery array 34. The thermal exchange plate 70 can be aluminum, for example. A coolant C can circulate through channels within the thermal exchange plate 70 to control thermal energy levels within other portions of the battery array 34. The coolant C could be used to cool the battery cell assembly 62, for example. In this example, the thermal exchange plate 70 directly contacts the rails 50a, 50b when the battery array 34 is resting on the rails 50a, 50b.

The mechanical fasteners 52 extend through respective apertures in the endplates 66a or 66b to engage the anchor plates 58a or 58b. In this example, the mechanical fastener 52 threadably engage weld nuts 80 of the anchor plates 58a, 58b. The mechanical fasteners 52 and the anchor plates 58a, 58b are positioned horizontally between the first rail 50a and the second rail 50b. The securing of the mechanical fasteners thus occurs from positions that are between the laterally outer regions 54a, 54b.

Extending the mechanical fasteners 52 through apertures in the endplates 66a, 66b can reduce a footprint of the battery array 34 as an access zone for a tool used to secure the mechanical fasteners 52 is above the battery array 34 rather to a lateral side of the battery array 34 or along an axially facing end of the battery array 34.

When securing the battery array 34 to the floor 46, the mechanical fasteners 52 are torqued down to threadably engage the anchor plates 58a and 58b. This draws the floor 46 and the anchor plates 58a, 58b relatively toward the battery array 34. The floor 46 and the anchor plates 58a, 58b can flex to permit this movement. The anchor plates 58a, 58b can contact the battery array 34 after the securing of the battery array 34 to the floor 46.

The torqueing down of the mechanical fasteners 52 clamps the first laterally outer region 54a against the rail 50a and the second laterally outer region 54b against the second rail 50b. A schematic representation of a path of the clamp load L that is applied through the first laterally outer region 54a to the rail 50a is shown in broken lines in FIG. 7. The path of the clamp load L extends through the laterally outer region 54a and the rail 50a. Another clamp load would have a path that extends through the laterally outer region 54b and the rail 50b.

The battery array 34 is spaced vertically from the floor 46 and the anchor plates 58a and 58b such that the torqueing down of the mechanical fasteners 52 does not disrupt the interface between the laterally outer region 54a and the first rail 50a or the interface between second laterally outer region 54b and the second rail 50b. Because the interfaces between the laterally outer regions 54a, 54b and the respective rails 50a, 50b are not disrupted, these interfaces can be used as a datum, or fixed reference point. The thermal exchange plate 70 and the remaining portions of the battery array 34 share a common datum in this example.

Figure 7:
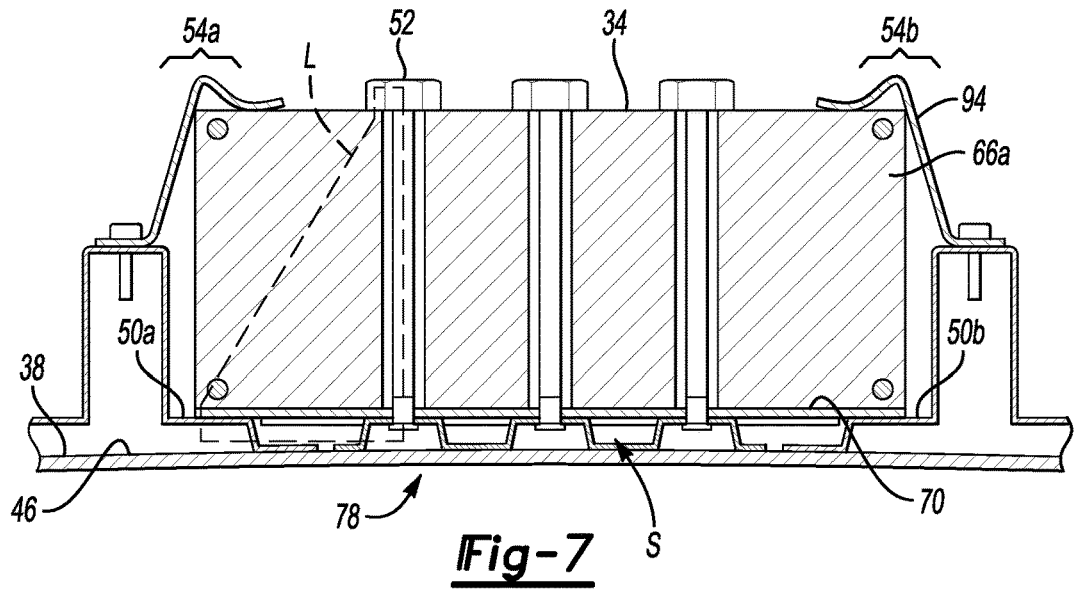
FIG. 7 illustrates a section taken at line 7-7 in FIG. 3.

The securing of the mechanical fasteners 52 can, in some examples, cause a portion 78 of the floor 46, a portion of the anchor plate 58a, 58b, or both, to deform slightly such that the anchor plates 58a, 58b, and the portion 78 of the floor 46 bow as shown in FIG. 7. While the anchor plate 58a, 58b, can contact the battery array 34, the contact does not result in areas of the first or second laterally outer regions 54a, 54b, lifting off of the respective rail 50a or 50b. That is, as the battery array 34 is installed within the enclosure 30, the battery array 34 first contacts the rails 50a, 50b. Then, as the mechanical fasteners 52 are torqued down, the battery array 34 is moved relatively toward the anchor plates 58a, 58b without lifting the battery array 34 off of the rails 50a, 50b.

A person having skill in this art and the benefit of this disclosure could adjust, among other things, the floor 46, the anchor plates 58a, 58b, and the space S to enable the mechanical fasteners 52 to be torqued into a secured position without causing the laterally outer regions 54a, 54b to lift off of one or both of the rails 50a, 50b.

Figure 8:
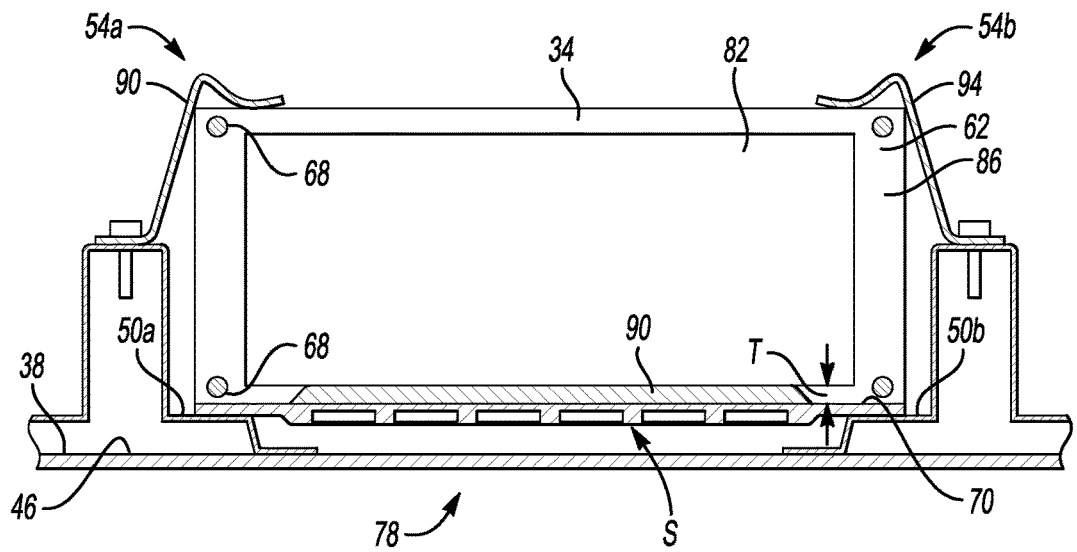
FIG. 8 illustrates a section taken at line 8-8 in FIG. 3.

With specific reference to FIG. 8, the battery cell assembly 62 can include a plurality of battery cells 82 each held within a frame 86. The frames 86 are disposed upon the thermal exchange plate 70.

A thermal interface material (TIM) 90 can be located between the battery cells 82 and portions of thermal exchange plate 70. The TIM 90 can be, for example, a liquid resin that is injected between the battery cells 82 and the thermal exchange plate 70, and then cured.

Because the securing of the battery array 34 does not significantly disrupt an interface between the laterally outer regions 54a, 54b, and the respective rails 50a, 50b, a distance between the thermal exchange plate 70 and the battery cells 82 can remain relatively consistent along an axial length of the battery array 34. Thus, a thickness T of the TIM 90 can remain relatively consistent, which can facilitate consistent thermal energy transfer between the thermal exchange plate 70 and, among other things, the battery cells 82.

In this exemplary embodiment, clamps 94 are additionally used to further secure the battery array 34 relative to the enclosure 30.

Features of the disposed examples include a retention method and assembly that secures a battery array relative to an enclosure structure without disrupting an interface between laterally outer regions of the array and respective rails disposed along lateral sides of the array. This can facilitate thermal energy transfer by helping to maintain a relative consistent gap so that a thickness of a thermal interface material can remain relatively consistent along the axial length of the array, and along the longitudinal width of the array. In some examples, the fasteners securing the battery arrays to the enclosure do not penetrate all the way through the floor of the enclosure. Thus, no extra sealing devices are required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A retention assembly, comprising: an enclosure; a first and a second rail; and a battery array having a first laterally outer region resting on the first rail and an opposing, second laterally outer region resting on the second rail, the battery array secured relative to the enclosure at a position spaced from the first and second laterally outer regions to clamp the first and second laterally outer regions against the first and second rails, wherein the first and the second rails are separate and distinct structures that are spaced a distance from one another, wherein the first and second rails are secured directly to a floor that is provided by a tray of the enclosure, wherein the tray is directly secured to a lid.

2. The retention assembly of claim 1, wherein the battery array is vertically elevated relative to the floor to provide a space between the battery array and the floor.

3. The retention assembly of claim 1, further comprising a thermal exchange plate, wherein the first and second laterally outer regions are laterally outer regions of the thermal exchange plate such that the thermal exchange plate spans from the first rail to the second rail and directly contacts both the first rail and the second rail.

4. The retention assembly of claim 1, wherein the enclosure includes a lid secured to a tray to enclose the battery array.

5. The retention assembly of claim 1, wherein the first laterally outer region rests on a vertically upward facing surface of the first rail.

6. The retention assembly of claim 1, wherein the first rail extends vertically beneath the first laterally outer region.

7. The retention assembly of claim 6, wherein the second rail extends vertically beneath the second laterally outer region.

8. A retention assembly, comprising:
an enclosure;
a first and a second rail; and
a battery array having a first laterally outer region resting on the first rail and an opposing, second laterally outer region resting on the second rail, the battery array secured relative to the enclosure at a position spaced from the first and second laterally outer regions to clamp the first and second laterally outer regions against the first and second rails,
an anchor plate and a mechanical fastener, the anchor plate secured directly to the enclosure between the first and the second rails at a position within the enclosure, the mechanical fastener engaging the anchor plate to secure the battery array relative to the enclosure.

9. The retention assembly of claim 8, wherein the mechanical fastener extends through an aperture in an endplate of the battery array to engage the anchor plate.

10. The retention assembly of claim 9, wherein the mechanical fastener threadably engages the anchor plate.

11. The retention assembly of claim 9, wherein the endplate directly contacts the anchor plate.

12. The retention assembly of claim 8, wherein the anchor plate and the enclosure include portions that are flexed toward the battery array when the mechanical fastener engages the anchor plate.

13. The retention assembly of claim 8, wherein the anchor plate is disposed vertically beneath the battery array.

14. The retention assembly of claim 8, wherein the mechanical fastener applies a clamp load when the mechanical fastener engages the anchor plate, a path of the clamp load extends through areas of the laterally outer regions that interface with the first and second rails.

15. The retention assembly of claim 8, wherein the anchor plate is disposed within the enclosure at a position that is horizontally between the first rail and the second rail such that no portion of the anchor plate horizontally overlaps with any portion of the first rail or the second rail.

16. The retention assembly of claim 8, wherein the mechanical fastener is horizontally spaced from all portions of the first rail and horizontally spaced from all portions of the second rail.

17. The retention assembly of claim 8, wherein the first and second rails are secured directly to a floor of the enclosure, wherein the anchor plate is disclosed on an interior of the enclosure between the floor and the battery array.

18. A retention assembly, comprising:
 a tray of an enclosure;
 a lid of the enclosure, the lid secured directly to the tray to provide an interior;
 a first rail secured directly to a floor of the tray within the interior;
 a second rail secured directly to the floor of the tray within the interior, the first and second rail separate and distinct structures that are spaced a distance from each other;
 a battery array having a first laterally outer region resting on the first rail and an opposing, second laterally outer region resting on the second rail, the battery array vertically elevated relative to the floor to provide a space between the battery array and the floor;
 an anchor plate secured directly to the enclosure between the first and the second rails at a position within the interior, the anchor plate separate and distinct from both the first rail and the second rail; and
 a mechanical fastener that extends through an aperture in an endplate of the battery array to engage the anchor plate to secure the battery array relative to the enclosure, wherein the mechanical fastener applies a clamp load when the mechanical fastener engages the anchor plate, wherein a path of the clamp load extends through areas of the laterally outer regions that interface with the first and second rails.

\* \* \* \* \*